US012647843B2

(12) United States Patent
Kim

(10) Patent No.: US 12,647,843 B2
(45) Date of Patent: Jun. 2, 2026

(54) METHOD AND APPARATUS FOR SUPPORTING EPS FALLBACK IN WIRELESS COMMUNICATION SYSTEM

(71) Applicant: Samsung Electronics Co., Ltd., Suwon-si (KR)

(72) Inventor: Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 18/475,013

(22) Filed: Sep. 26, 2023

(65) Prior Publication Data

US 2024/0107385 A1     Mar. 28, 2024

(30) Foreign Application Priority Data

Sep. 28, 2022     (KR) ........................ 10-2022-0123257

(51) Int. Cl.
*H04W 36/00*          (2009.01)
*H04W 76/30*          (2018.01)

(52) U.S. Cl.
CPC . *H04W 36/00226* (2023.05); *H04W 36/0058* (2018.08); *H04W 76/30* (2018.02)

(58) Field of Classification Search
CPC ....... H04W 36/0022; H04W 36/00226; H04W 36/0058; H04W 76/30
See application file for complete search history.

(56) References Cited

U.S. PATENT DOCUMENTS

| | | | |
|---|---|---|---|
| 2023/0088189 A1* | 3/2023 | Tseng ................ | H04W 52/0225 370/252 |
| 2023/0354078 A1* | 11/2023 | Liu ..................... | H04L 41/0806 |
| 2024/0187982 A1* | 6/2024 | Murugan .............. | H04W 48/20 |
| 2024/0224104 A1* | 7/2024 | Wang .................. | H04W 36/302 |
| 2025/0212078 A1* | 6/2025 | Gu ........................ | H04W 36/30 |

FOREIGN PATENT DOCUMENTS

KR      10-2023-0093907 A      6/2023

OTHER PUBLICATIONS

Vivo, "Report of [AT119-e][020][NR17] TEI Corroctions," R2-2208999, 3GPP TSG-RAN WG2 Meeting #119-electronic, Online, Aug. 17-29, 2022, 20 pages.

* cited by examiner

*Primary Examiner* — Awet Haile

(57) ABSTRACT
The disclosure relates to a 5G or 6G communication system for supporting a higher data rate. A method performed by a user equipment (UE) includes receiving from a base station first configuration information including information on frequencies for early measurement reporting (EMR), receiving from the base station second configuration information including information on frequencies for cell reselection, transmitting to the base station a message including a measurement result of at least some of the frequencies for EMR and the frequencies for cell reselection, and performing EPS fallback to one frequency based on the measurement result. In case that the second configuration information comprises a field indicating fallback or the UE has switched to a connected mode to start an IP multimedia subsystem (IMS) voice service, the message comprises a measurement result of at least some of the frequencies for cell reselection.

16 Claims, 10 Drawing Sheets

(a)

(b)

METHOD AND APPARATUS FOR SUPPORTING EPS FALLBACK IN WIRELESS COMMUNICATION SYSTEM

CROSS-REFERENCE TO RELATED APPLICATIONS

This application is based on and claims priority under 35 U.S.C. 119 to Korean Patent Application No. 10-2022-0123257, filed on Sep. 28, 2022, in the Korean Intellectual Property Office, the disclosure of which is herein incorporated by reference in its entirety.

BACKGROUND

1. Field

The disclosure relates to a method for controlling a UE and a base station in a wireless communication system and, more particularly, to a method of a UE and a base station for supporting EPS fallback and an apparatus therefor.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR, VR, and the like (XR=AR+VR+MR), 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure proposes a method and an apparatus for a UE to efficiently report an EUTRA frequency configured for early management reporting (EMR) and an EUTRA frequency for cell reselection indicated by a SIB5.

A procedure for reporting a cell measurement configuration and a cell measurement result may cause a delay in performing EPS fallback. Therefore, the disclosure proposes a method and an apparatus for solving the delay.

The disclosure provides a method of a UE performing evolved packet system (EPS) fallback in a wireless communication system, the method including: receiving first configuration information including information about frequencies for early measurement reporting (EMR) from a base station; receiving second configuration information including information about frequencies for cell reselection from the base station; transmitting a message including a measurement result of at least some of the frequencies for EMR and the frequencies for cell reselection to the base station; and performing EPS fallback to one frequency, based on the measurement result, wherein, when the second configuration information includes a field indicating fallback or the UE is a UE switched to a connected mode to start an IP multimedia subsystem (IMS) voice service, the message includes a measurement result of at least some of the frequencies for cell reselection.

Selectively, the number of the frequencies for cell reselection that the message includes may be limited to be less than the maximum number of frequencies that the message includes. Selectively, at least some of the frequencies for EMR and the frequencies for cell reselection that the message includes may be determined as frequencies having a signal strength higher than a specific threshold value. Selectively, the message may include only a measurement result of the frequencies for cell reselection. Selectively, the message may include an extended measurement result log information element (IE) having the sum of the number of the frequencies for EMR and the number of frequencies for cell reselection as a maximum value. Selectively, the message may include a first IE logging a measurement result of the frequencies for EMR and a second IE logging a measurement result of the frequencies for cell reselection. Selectively, the method may further include receiving an indicator indicating that the extended measurement result log IE or the second IE is supported. Selectively, the first configuration information may be received through a system information block11 (SIB11) or a radio resource control release (RRCRelease) message, and the second configuration information may be received through a SIB5. Selectively, the measurement result may be included in a measResultIdleEUTRA IE, and the message may be a UEInformationResponse message or an RRCResumeComplete message. Selectively, the method may further include transmitting an RRCsetupRequest message or an RRCResumeRequest message including a predetermined cause value indicating the IMS voice service to the base station.

The disclosure provides a method of a base station supporting EPS fallback in a wireless communication system, the method including: transmitting first configuration information including information about frequencies for EMR to a UE; transmitting second configuration information including information about frequencies for cell reselection to the UE; receiving a message including a measurement result of at least some of the frequencies for EMR and the frequencies for cell reselection from the UE; and performing EPS fallback of the UE to one frequency, based on the measurement result, wherein, when the second configuration information includes a field indicating fallback or the UE is a UE switched to a connected mode to start an IMS voice service, the message includes a measurement result of at least some of the frequencies for cell reselection.

The disclosure provides a UE performing EPS fallback in a wireless communication system, the UE including: a transceiver; and a processor configured to control the transceiver to receive first configuration information including information about frequencies for EMR from a base station, receive second configuration information including information about frequencies for cell reselection from the base station, transmit a message including a measurement result of at least some of the frequencies for EMR and the frequencies for cell reselection to the base station, and perform EPS fallback to one frequency, based on the measurement result, wherein, when the second configuration information includes a field indicating fallback or the UE is a UE switched to a connected mode to start an IMS voice service, the message includes a measurement result of at least some of the frequencies for cell reselection.

The disclosure provides a base station supporting EPS fallback in a wireless communication system, the base station including: a transceiver; and a processor configured to control the transceiver to transmit first configuration information including information about frequencies for EMR to a UE, transmit second configuration information including information about frequencies for cell reselection to the UE, receive a message including a measurement result of at least some of the frequencies for EMR and the frequencies for cell reselection from the UE, and perform EPS fallback of the UE to one frequency, based on the measurement result, wherein, when the second configuration information includes a field indicating fallback or the UE is a UE switched to a connected mode to start an IMS voice service, the message includes a measurement result of at least some of the frequencies for cell reselection.

A UE according to the disclosure may efficiently report an EUTRA frequency configured for EMR and an EUTRA frequency for cell reselection indicated by a SIB5.

A method and an apparatus according to the disclosure may improve a procedure for reporting a cell measurement configuration and a cell measurement result, thereby reducing a delay in performing EPS fallback.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. In describing the disclosure below, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Before a detailed description of the disclosure is made, examples of interpretable meanings of several terms used in the disclosure will be present. However, it should be noted that the terms are not limited to the examples provided below.

A base station is an entity that communicates with a UE, and may also be referred to as a BS, a NodeB (NB), an eNode B (eNB), a new radio node B (hereinafter, a gNB), an access point (AP), or the like.

A user equipment (UE) is an entity that communicates with a base station, and may also be referred to as a UE, a mobile station (MS), a mobile equipment (ME), a device, a terminal, or the like.

Figure 1:
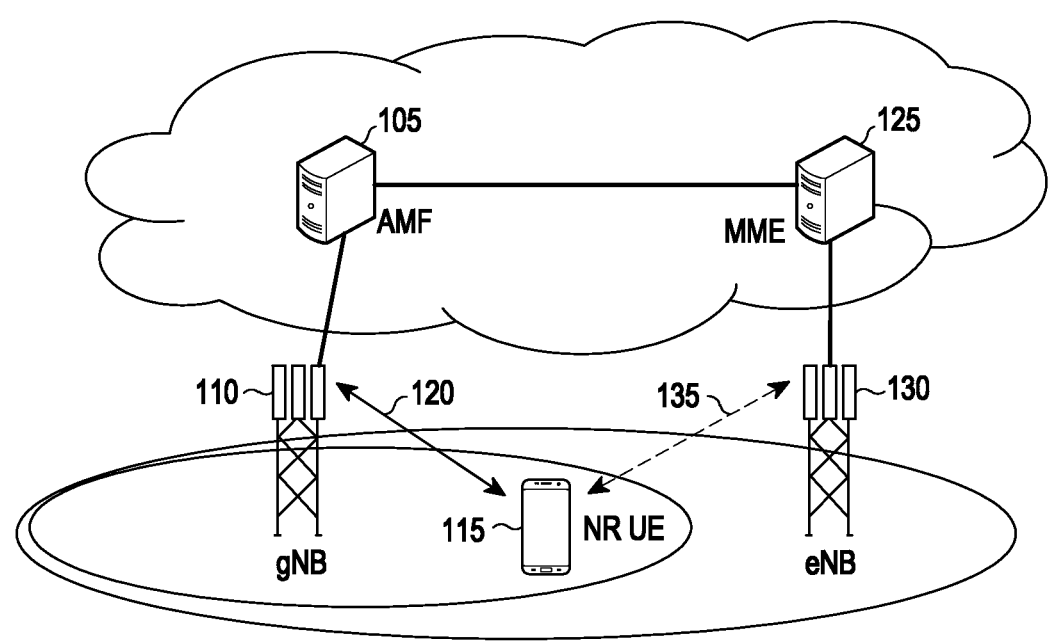
FIG. 1 illustrates the structure of a next-generation mobile communication system according to an embodiment of the disclosure.
Figure 2:
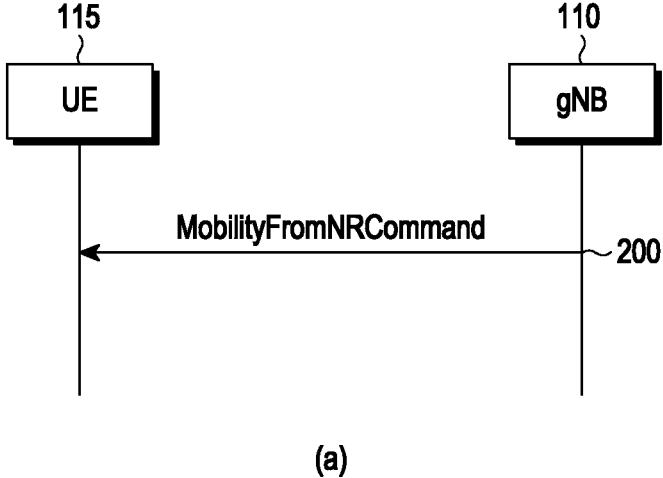
FIG. 2A illustrates a procedure of indicating voice fallback according to an embodiment of the disclosure.
FIG. 2B illustrates a procedure of indicating voice fallback according to an embodiment of the disclosure.
Figure 2:
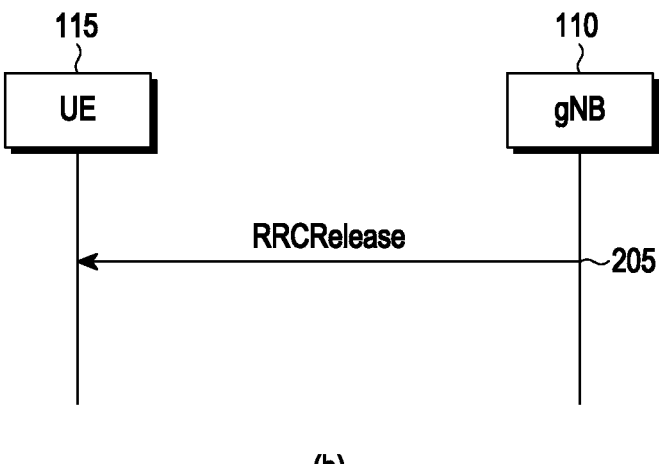

FIG. 1 illustrates an example of a next-generation mobile communication system.

Referring to FIG. 1, a radio access network of the next-generation mobile communication system (new radio: NR) may include a new radio node B (hereinafter, a gNB) 110 and an access and mobility management function (AMF) 105 (new radio core network). A new radio user equipment (hereinafter, an NR UE or UE) 115 may access an external network through the gNB 110 and the AMF 105.

In FIG. 1, the gNB 110 corresponds to an evolved node B (eNB) 130 of an LTE system. The gNB 110 is connected to the NR UE 115 over a wireless channel, and may provide a more advanced service than that of an existing node B (120). In the next-generation mobile communication system NR, all user traffic is served through a shared channel, and a device that collects state information, such as a buffer status of UEs, an available transmission power state, and a channel state, and performs scheduling is required. In NR, the gNB 110 is in charge of the scheduling. One gNB may control a plurality of cells. The NR may have an existing maximum bandwidth or greater in order to realize ultrahigh-speed data transmission compared to LTE, and may employ a beam-forming technique in addition to orthogonal frequency-division multiplexing (hereinafter, OFDM) as a radio access technology. In addition, NR applies adaptive modulation and coding (hereinafter, AMC), which determines a modulation scheme and a channel coding rate according to the channel state of a UE. The AMF 105 may perform functions of mobility support, bearer setup, and QoS setup. The AMF 105 is a device that performs not only a mobility management function for the UE 115 but also various control functions, and may be connected to a plurality of base stations. The next-generation mobile communication system may also interwork with the LTE system, in which case the AMF 105 may be connected to an MME 125 through a network interface. The MME 125 is connected to the eNB 130, which is a base station of the LTE system. The UE supporting LTE-NR dual connectivity (EN-DC) may transmit and receive data while maintaining connection not only to the gNB 110 but also to the eNB 130 (135).

FIG. 2A illustrates a procedure of indicating voice fallback according to an embodiment of the disclosure, and FIG. 2B illustrates a procedure of indicating voice fallback according to an embodiment of the disclosure.

In the disclosure, voice fallback refers to evolved packet system (EPS) fallback that connects a UE connected to NR to LTE supporting an IP multimedia subsystem (IMS) voice service to provide the UE with the IMS voice service. When a higher network entity indicates to an NR base station 110 that EPS fallback is needed for one UE 115, the NR base station 110 triggers an inter-radio access technology (RAT)

handover (inter-RAT HO) or a redirection to enable the UE 115 to be connected to an LTE base station. In the inter-RAT HO or redirection, the NR base station 110 indicates that the inter-RAT HO or redirection is for voice fallback, enabling the UE to satisfy a corresponding requirement or to make necessary preparation. For example, the NR base station 110 may transmit a MobilityFromNRCommand message 200 including configuration information about the inter-RAT HO to the UE 115 (FIG. 2A), and may include voiceFallback-Indication, which is an indicator indicating a voice fallback, in the MobilityFromNRCommand message 200. Alternatively, the NR base station 110 may transmit an RRCRelease message 205 including configuration information about the redirection to the UE 115 for the redirection (FIG. 2B), and may include voiceFallbackIndication, which is an indicator indicating a voice fallback, in the RRCRelease message 205.

Figure 3:
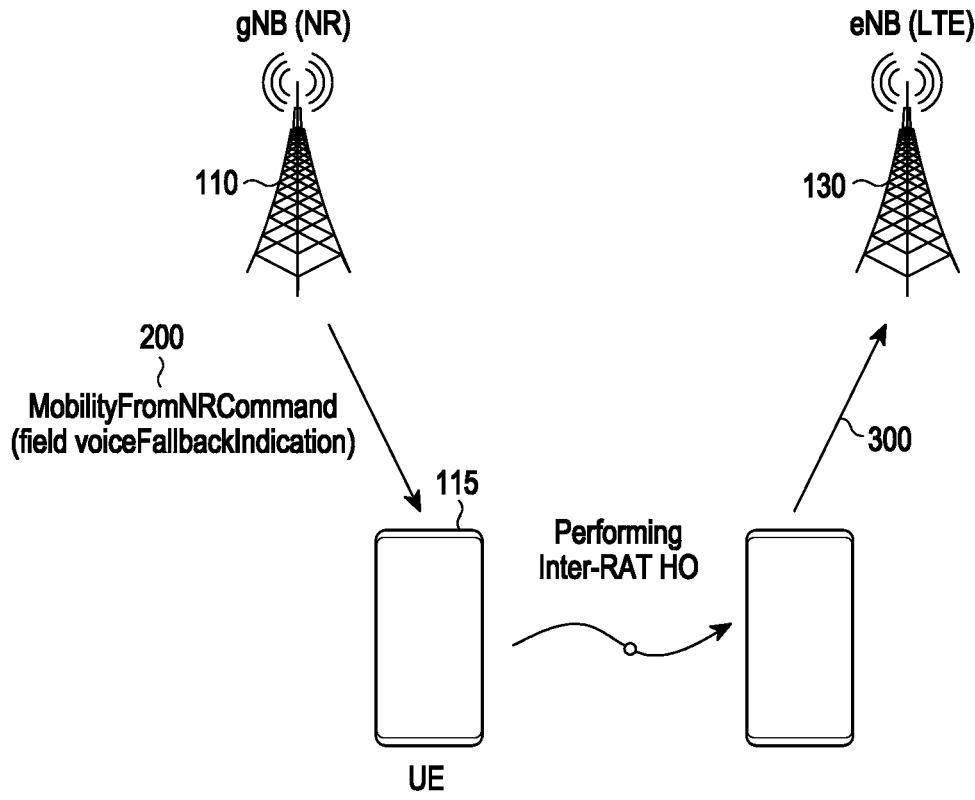
FIG. 3 illustrates an operation of logging voice fallback-related information in an inter-RAT handover according to an embodiment of the disclosure.

FIG. 3 illustrates an operation of logging voice fallback-related information in an inter-RAT handover according to an embodiment of the disclosure.

The disclosure proposes a method for a UE to log and report information related to a voice fallback operation to optimize the voice fallback operation. The logged information may be reported to a network through a radio link failure (RLF) report, a connection establishment failure (CEF) report, and a successful HO report. For example, a UE 115 receives a MobilityFromNRCommand message 200 including a voiceFallbackIndication from a base station 110, and may log predetermined information when a predetermined condition is satisfied. The logged information may be reported to base stations 110 and 130 through a predetermined procedure (300). To reduce time used for EPS fallback, early measurement reporting (EMR), which the UE reports to the base station, may be used for EPS fallback. The disclosure explains a method and an apparatus for logging or reporting information related to EPS fallback when the EPS fallback is performed using EMR.

Figure 4A:
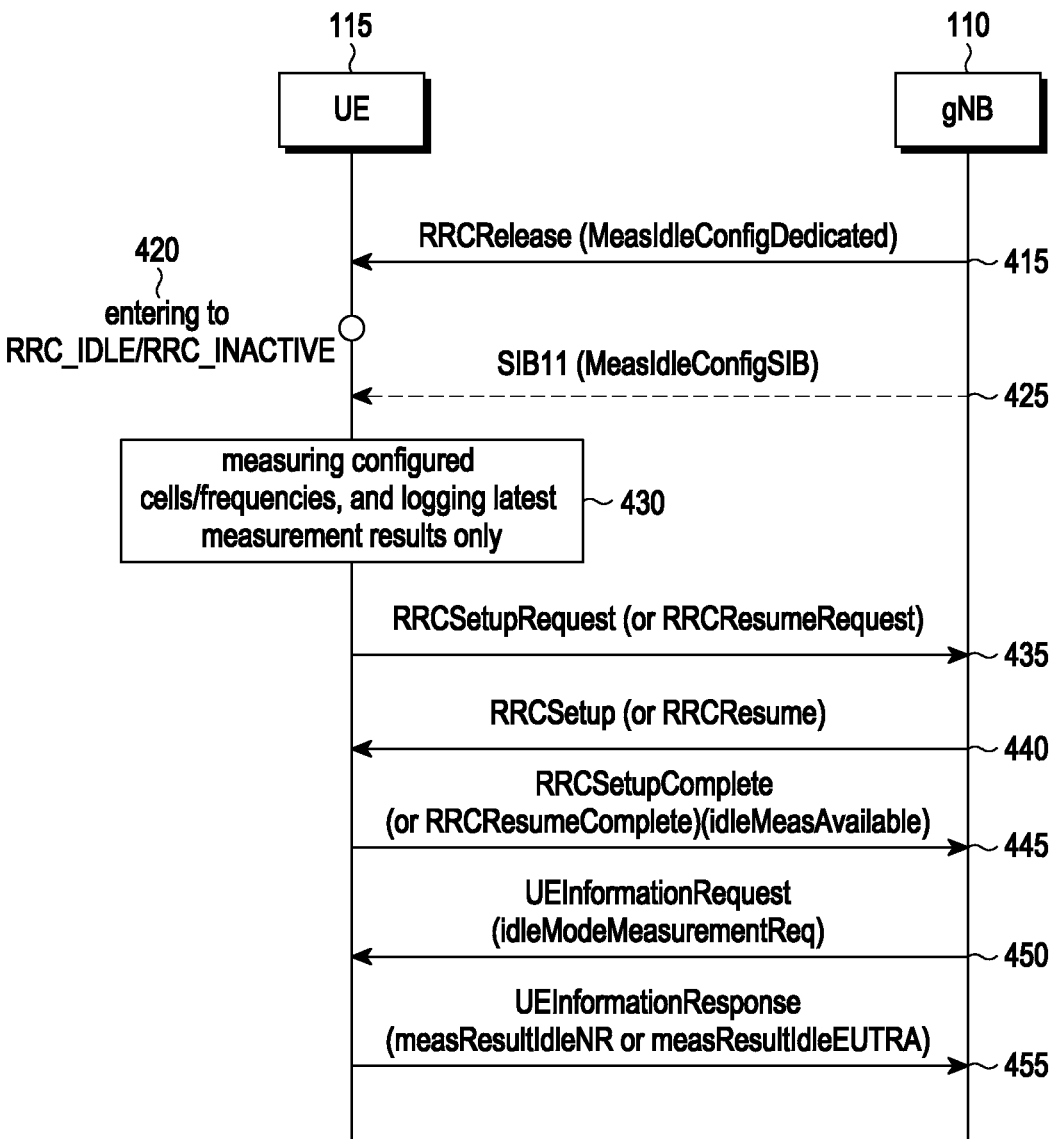
FIG. 4A illustrates a flowchart for an EMR process according to an embodiment of the disclosure.
Figure 4B:
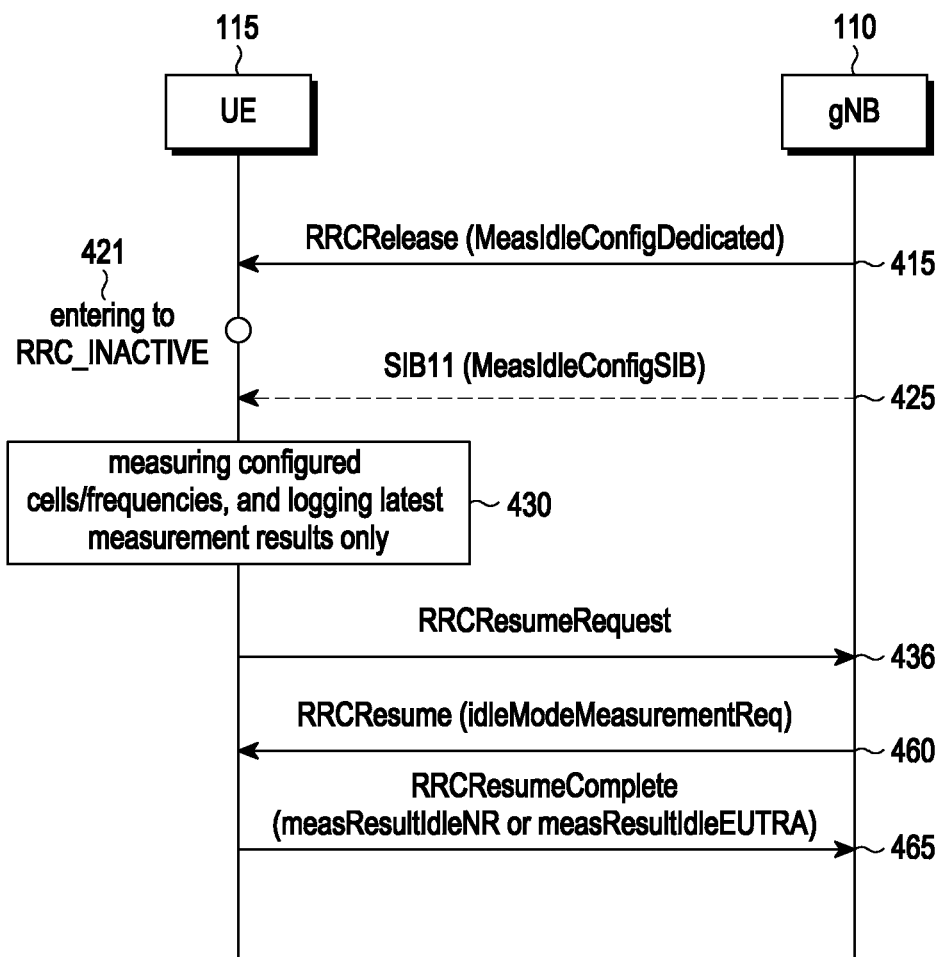
FIG. 4B illustrates a flowchart for an EMR process according to an embodiment of the disclosure.

FIG. 4A illustrates a flowchart for an early measurement reporting (EMR) process according to an embodiment of the disclosure, and FIG. 4B illustrates a flowchart for an early measurement reporting (EMR) process according to an embodiment of the disclosure.

Early measurement reporting (EMR) is a technique in which a UE quickly reports latest cell measurement information collected in a standby mode (e.g., RRC_IDLE mode) or inactive mode (e.g., RRC_INACTIVE mode) to a base station after switching to a connected mode (e.g., RRC_CO-NNECTED mode). When the UE needs to be provided with a data transmission service at a high data rate, the base station may first configure the UE to perform a neighboring cell measurement operation and a measurement result report. The base station may select an appropriate cell capable of providing good signal strength, based on a cell measurement result reported from the UE, and may config-ure the selected cell as a secondary cell (SCell). Accordingly, an operation of configuring one SCell may be slightly delayed due to a cell measurement configuration and report process. To solve this delay, the base station may configure EMR for the UE.

An EMR operation is described with reference to FIG. 4A.

A base station 110 may transmit an RRCRelease message including a MeasIdleConfigDedicated information element (IE) to a UE 115 (415). The MeasIdleConfigDedicated IE may include EMR configuration information used to per-form an EMR operation.

Upon receiving the RRCRelease message 415, the UE 115 may switch from a connected mode (RRC_CON-NECTED) to a standby mode or an inactive mode (420).

The UE 115 may receive a predetermined system infor-mation block (SIB) (e.g., SIB11) including a MeasIdleCon-figSIB IE (425).

The MeasIdleConfigDedicated IE may include, as an example of the EMR configuration information, NR fre-quency or EUTRA frequency information that the UE uses to measure and log for EMR. When the MeasIdleCon-figDedicated IE does not include the frequency information, the UE may consider NR frequency or E-UTRA frequency information included in the MeasIdleConfigSIB IE.

The UE 115 may measure a preset NR frequency or E-UTRA frequency by using the EMR configuration infor-mation, and may log a most recent measurement result (430). According to the current 3GPP standard, the UE may log up to eight frequency measurement results for each NR and E-UTRA.

The UE 115 may transmit an RRCSetupRequest or RRCResumeRequest message to the base station to switch to the connected mode (435).

Upon receiving the message, the base station 110 may transmit an RRCSetup or RRCResume message to the UE (440).

The UE 115 may transmit an RRCSetupComplete or RRCResumeComplete message including an idle-MeasAvailable field, which is a predetermined availability indicator, to the base station 110 (445). The idleMeasAvail-able field is used to indicate that the UE 115 has an EMR measurement result.

The base station 110 may transmit a UEInformationRe-quest message including idleModeMeasurementReq, which is a predetermined field for requesting a report of the measurement result, to the UE 115 (450).

Upon receiving the UEInformationRequest message 450, the UE 115 may transmit a UEInformationResponse mes-sage including the EMR measurement result to the base station 110 (455).

An EMR operation is described with reference to FIG. 4B.

In particular, when the UE 115 in the inactive mode 421 switches to the connected mode, the base station 110 may transmit an RRCResume message including an idleMode-MeasurementReq field to the UE in response to an RRCRe-sumeRequest message 436 (460).

Upon receiving the RRCResume message 460, the UE 115 may report an RRCResumeComplete message including an EMR measurement result 430 to the base station (465). Using the RRCResumeComplete message including the EMR measurement result 430 of FIG. 4B enables the UE 115 to report the EMR measurement result 430 to the base station 110 more quickly than using UE information pro-cesses 450 and 455 of FIG. 4A.

Figure 5A:
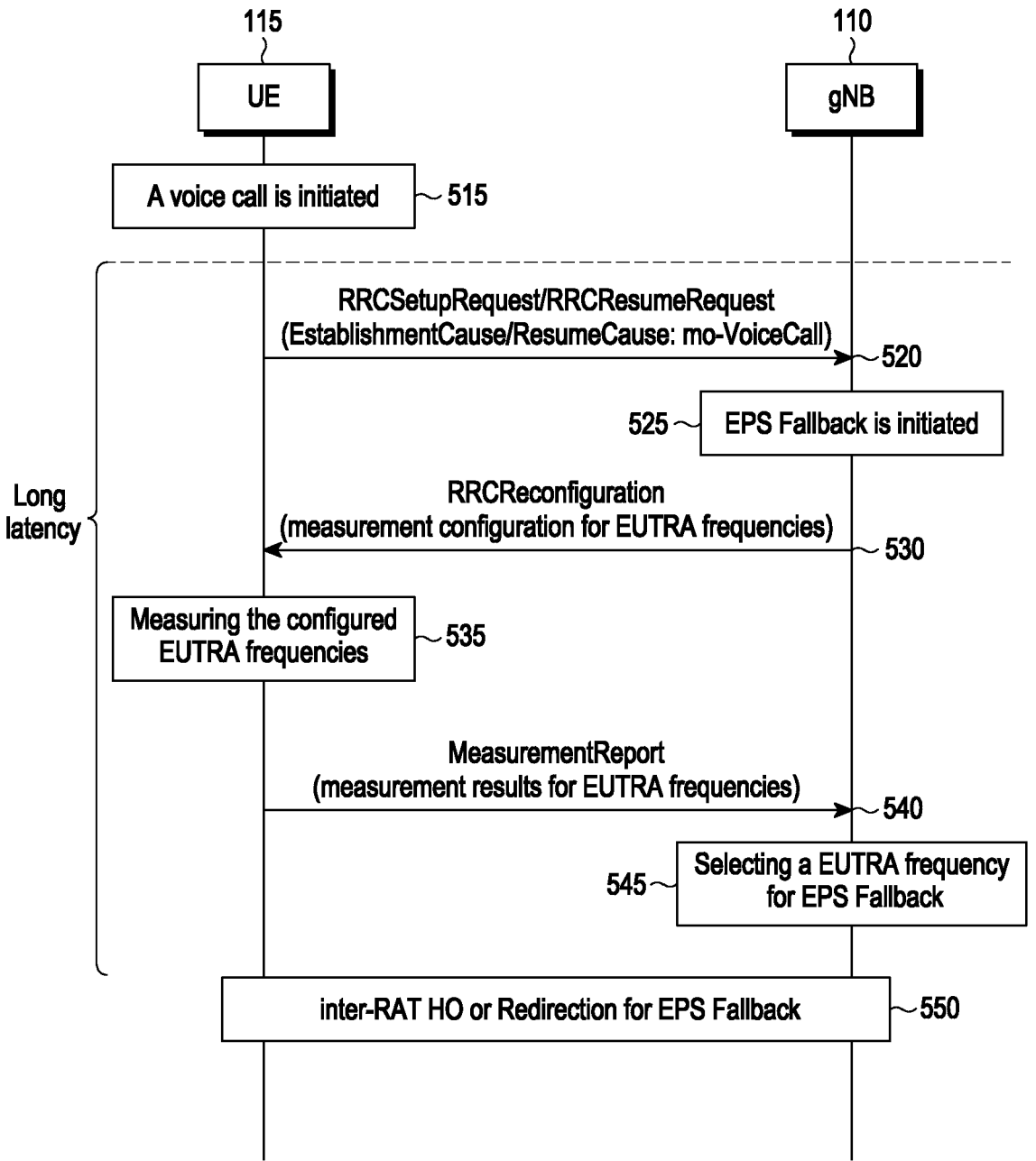
FIG. 5A illustrates a flowchart for an EPS fallback process according to an embodiment of the disclosure.

FIG. 5A illustrates a flowchart for an EPS fallback process according to an embodiment of the disclosure.

A UE 115 camping on an NR base station 110 may initiate an IMS voice service (515).

The UE may transmit an RRCSetupRequest or RRCRe-sumeRequest message including mo-VoiceCall, which is a predetermined cause value indicating the IMS voice service, to the base station (520).

Upon receiving the message 520, the base station 110 may trigger EPS fallback (525). EPS fallback is an operation in which the NR base station directs a UE requiring an IMS voice service to an evolved universal terrestrial radio access (EUTRA) base station to receive the IMS voice service. The NR base station may trigger EPS fallback when not yet configured with a function of providing an IMS service, or the NR base station may trigger EPS fallback for load balancing.

To perform the EPS fallback, the base station 110 may configure the UE 115 to perform signal measurement in a neighboring EUTRA frequency and a result report through an RRCReconfiguration message (530).

According to cell measurement configuration information 530, the UE 115 may measure a configured EUTRA frequency (535).

The UE 115 may transmit a MeasurementReport message including a result of measurement 535 to the base station 110 (540).

Upon receiving the message 540, the base station 110 may select one EUTRA frequency suitable for the EPS fallback, based on the result of cell measurement included in the message 540 (545).

The base station 110 may configure an inter-RAT handover or redirection operation of the UE 115 to the selected EUTRA frequency (550).

Like the foregoing cause of delaying SCell configuration, a cell measurement configuration and report procedure may be a factor of a delay in performing EPS fallback. Therefore, to solve this delay, the foregoing EMR operation may be utilized.

Figure 5B:
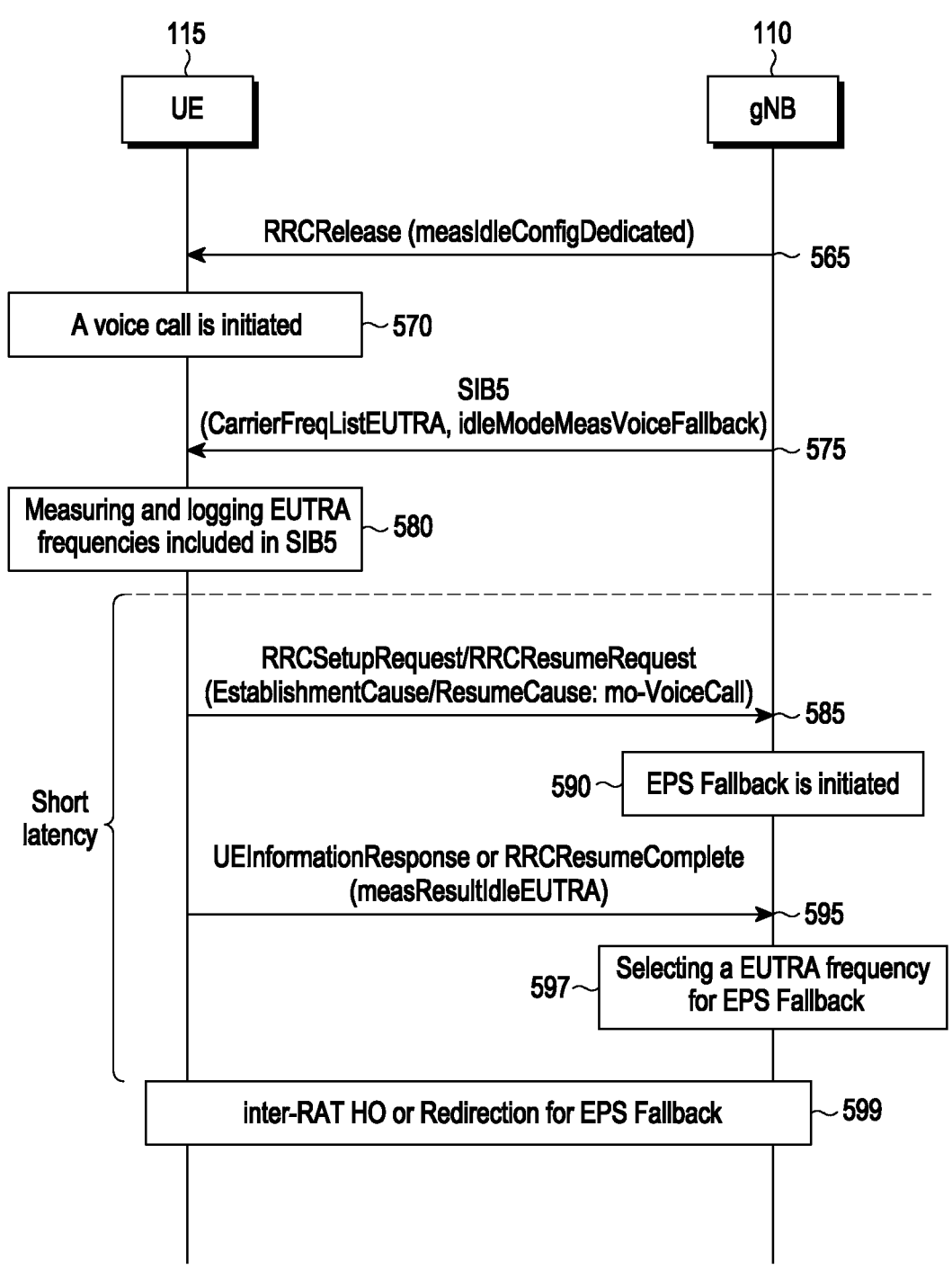
FIG. 5B illustrates a flowchart for an early EPS fallback process according to an embodiment of the disclosure.

FIG. 5B illustrates a flowchart for an early EPS fallback process according to an embodiment of the disclosure.

The base station 110 may transmit an RRCRelease message including a MeasIdleConfigDedicated IE to the UE 115

The UE may transmit an RRCSetupRequest or RRCResumeRequest message including mo-VoiceCall, which is a predetermined cause value indicating the IMS voice service, to the base station (585).

Upon receiving the message 585, the base station 110 may trigger an EPS fallback operation (590).

An EUTRA frequency measurement result used to perform EPS fallback may be transmitted to the base station through a UEInformationResponse or RRCResumeComplete message (595) as in an EMR operation 455 or 465 of FIG. 4A or 4B.

Upon receiving the message 595, the base station 110 may select one EUTRA frequency suitable for the EPS fallback, based on a cell measurement result included in the message 595 (597).

The base station 110 may configure an inter-RAT handover or redirection operation of the UE 115 to the selected EUTRA frequency (599).

A measurement result of the EUTRA frequency for cell reselection for the EPS fallback provided in SIB5 may also be reported to the base station through the EMR operation, thus reducing time used in the EPS fallback. In the disclosure, the EPS fallback operation using an EMR measurement result is referred to as early EPS fallback.

This disclosure proposes a method for a UE to collect and efficiently log frequency information related to early EPS fallback.

A base station may configure up to eight EUTRA frequencies that a UE uses to measure and report for EMR through SIB11 (see relevant part captured from 3GPP TS38.331 in Table 1).

TABLE 1

| MeasIdleConfig information element |
|---|

```
MeasIdleConfigSIB-r16 ::= SEQUENCE {
    measIdleCarrierListNR-r16              SEQUENCE (SIZE (1..maxFreqIdle-r16)) OF
MeasIdleCarrierNR-r16                      OPTIONAL,     -- Need S
    measIdleCarrierListEUTRA-r16           SEQUENCE (SIZE (1..maxFreqIdle-r16)) OF
MeasIdleCarrierEUTRA-r16                   OPTIONAL,     -- Need S ...
}
MeasIdleConfigDedicated-r16 ::= SEQUENCE {
    measIdleCarrierListNR-r16              SEQUENCE (SIZE (1..maxFreqIdle-r16)) OF
MeasIdleCarrierNR-r16                      OPTIONAL,     -- Need N
    measIdleCarrierListEUTRA-r16           SEQUENCE (SIZE (1..maxFreqIdle-r16)) OF
MeasIdleCarrierEUTRA-r16                   OPTIONAL,     -- Need N
    measIdleDuration-r16                        ENUMERATED{sec10, sec30, sec60,
sec120, sec180, sec240, sec300, spare},
    validity AreaList-r16                                      Validity AreaList-r16
OPTIONAL,       -- Need N ...
}
maxFreqIdle-r16                            INTEGER ::= 8       -- Maximum
number of carrier frequencies for idle/inactive measurements
```

(565). The MeasIdleConfigDedicated IE may include information used to perform an EMR operation. Upon receiving the RRCRelease message 565, the UE 115 switches from a connected mode to a standby mode or an inactive mode.

The UE 115 may trigger an IMS voice service (570).

The UE 115 may identify whether an idleMode-MeasVoiceFallback field is included in a SIB5 575. When the idleModeMeasVoiceFallback field is included in the SIB5 575, the UE 115 triggering the IMS voice service may also consider an EUTRA frequency CarrierFreqListEUTRA for cell reselection stored in the SIB5 575 as a frequency logged through an EMR operation (580).

The UE may report up to eight EUTRA frequencies measured and logged according to the above configuration information. (See relevant part captured from 3GPP TS38.331 in Table 2).

TABLE 2

| - MeasResultIdleEUTRA |
|---|
| The IE MeasResultIdleEUTRA covers the E-UTRA measurement results performed in RRC_IDLE and RRC_INACTIVE. |
| MeasResultIdleEUTRA information element |

```
MeasResultIdleEUTRA-r16 ::= SEQUENCE {
    measResultsPerCarrierListIdleEUTRA-r16          SEQUENCE  (SIZE
(1..maxFreqIdle-r16)) OF MeasResultsPerCarrierIdleEUTRA-r16,
```

TABLE 2-continued

```
- MeasResultIdleEUTRA
The IE MeasResultIdleEUTRA covers the E-UTRA measurement
results performed in RRC_IDLE and RRC_INACTIVE.
MeasResultIdleEUTRA information element ...
}
MeasResultsPerCarrierIdleEUTRA-r16 ::=  SEQUENCE {
    carrierFreqEUTRA-r16                    ARFCN-ValueEUTRA,
    measResultsPerCellListIdleEUTRA-r16        SEQUENCE
                                            (SIZE
(1..maxCellMeasIdle-r16)) OF MeasResultsPerCellIdleEUTRA-r16,
    ...
}
MeasResultsPerCellIdleEUTRA-r16 ::=     SEQUENCE {
    eutra-PhysCellId-r16                    EUTRA-PhysCellId,
    measIdleResultEUTRA-r16                 SEQUENCE {
        rsrp-ResultEUTRA-r16                    RSRP-RangeEUTRA
OPTIONAL,
        rsrq-ResultEUTRA-r16                RSRQ-RangeEUTRA-
OPTIONAL                                r16
    },
    ...
}
```

In this disclosure, for early EPS fallback, the captured MeasResultIdleEUTRA IE structure is utilized. When an idleModeMeasVoiceFallback field is included in a SIB5, the UE may also include an EUTRA frequency CarrierFreqListEUTRA for cell reselection stored in the SIB5 in the MeasResultIdleEUTRA IE. Here, the base station may configure up to eight EUTRA frequencies through the SIB5 (see relevant part captured from TS38.331 in Table 3).

TABLE 3

```
- SIB5
SIB5 contains information relevant only for inter-RAT cell re-selection i.e. information
about E-UTRA frequencies and E-UTRAs neighbouring cells relevant for cell reselection.
The IE includes cell re-selection parameters common for a frequency.
SIB5 information element SIB5 ::=                        SEQUENCE {
    carrierFreqListEUTRA                         CarrierFreqListEUTRA
OPTIONAL,        -- Need R
    t-ReselectionEUTRA             T-Reselection,
    t-ReselectionEUTRA-SF                        SpeedStateScaleFactors
OPTIONAL,        -- Need S
    lateNonCriticalExtension                     OCTET STRING
OPTIONAL,
    ...,
    [[
    carrierFreqListEUTRA-v1610                   CarrierFreqListEUTRA-v1610
OPTIONAL        -- Need R
    ]],
    [[
    carrierFreqListEUTRA-v1700                   CarrierFreqListEUTRA-v1700
OPTIONAL,        -- Need R
    idleModeMeasVoiceFallback-r17                ENUMERATED{true}
OPTIONAL        -- Need R
    ]]
}
CarrierFreqListEUTRA ::=        SEQUENCE (SIZE (1..maxEUTRA-Carrier))
OF CarrierFreqEUTRA
CarrierFreqListEUTRA-v1610 ::=  SEQUENCE (SIZE (1..maxEUTRA-Carrier))
OF CarrierFreqEUTRA-v1610
CarrierFreqListEUTRA-v1700 ::=  SEQUENCE (SIZE (1..maxEUTRA-Carrier)
OF CarrierFreqEUTRA-v1700
maxEUTRA-Carrier               INTEGER ::= 8        -- Maximum
number of E-UTRA carriers in SIB list
```

Therefore, when the base station configures up to eight EUTRA frequencies that the UE uses to measure and report for EMR through an RRCRelease or SIB11 and configures up to eight EUTRA frequencies for cell reselection through the SIB5, the UE is unable to include measurement results of all the EUTRA frequencies in the MeasResultIdleEUTRA IE that is capable of including up to eight measurement results. When the UE reports only the results of the EUTRA frequencies indicated by the SIB5 even though EMR is configured, an effect of ignoring EMR configuration of the base station occurs, which means that it is impossible to satisfy an original purpose of EMR, that is, fast SCell configuration. Therefore, the disclosure proposes a method for a UE to efficiently report an EUTRA frequency configured for EMR and an EUTRA frequency indicated by a SIB5.

Figure 6:
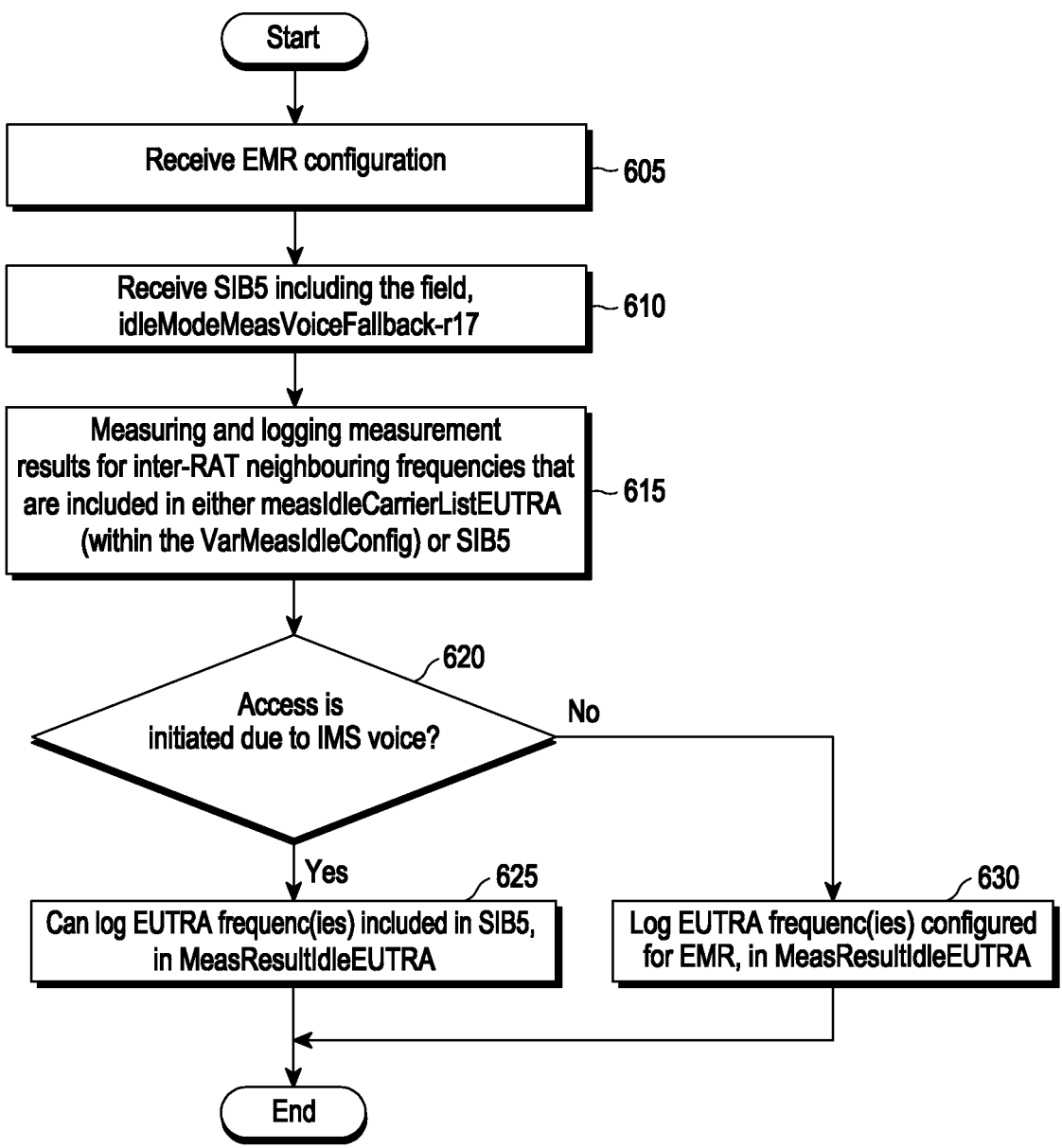
FIG. 6 illustrates a flowchart for a UE operation of logging an EUTRA frequency configured in a SIB5 according to an embodiment of the disclosure.

FIG. 6 illustrates a flowchart for a UE operation of logging an EUTRA frequency configured in a SIB5 according to an embodiment of the disclosure.

A UE may receive EMR configuration information from a base station (605). That is, the UE may receive an RRCRelease message including a MeasIdleConfigDedicated IE. Information about a frequency to be measured and stored by the UE for EMR may be included in the MeasIdleConfigDedicated IE included in the RRCRelease message or a MeasIdleConfigSIB IE included in a SIB11.

The UE may receive a SIB5 including an idleModeMeasVoiceFallback field from the base station (610). When the SIB5 includes the idleModeMeasVoiceFallback field, EUTRA frequencies for cell reselection configured in the SIB5 may be reported to the base station through an EMR operation. The base station may broadcast an eCallOverIMS-Support field, which is an indicator indicating whether an IMS service is supported, through a SIB 1. When the eCallOverIMS-Support field is absent in the SIB1, the base station may consider (or determine) triggering EPS fallback for the UE desiring the IMS service.

The UE may measure the EUTRA frequency (measIdle-CarrierListEUTRA) indicated by the MeasIdleConfigDedicated IE or the MeasIdleConfigSlB IE or the frequencies indicated by the SIB5 according to a predetermined period, and may log a most recent measurement result (615). Since the maximum number (e.g., 8) of frequencies to be logged and reported through an EMR operation is determined, the UE may select a frequency to be logged according to a method proposed in the disclosure.

The UE may identify whether an IMS voice service is triggered (620).

When the UE is switched to a connected mode to receive the IMS voice service, the UE may report a MeasResultIdleEUTRA IE including measurement results of the frequencies indicated by the SIB5 to the base station (625). Here, a measurement result of the EUTRA frequency indicated by the MeasIdleConfigDedicated IE or the MeasIdleConfigSlB IE may also be included in the MeasResultIdleEUTRA IE.

When the UE is switched to the connected mode to receive a service other than the IMS voice service, the UE may report a MeasResultIdleEUTRA IE including the measurement result of the EUTRA frequency indicated by the MeasIdleConfigDedicated IE or the MeasIdleConfigSlB IE to the base station (630).

When the UE needs to be provided with the IMS service and at least one of the following conditions is satisfied, the EUTRA frequencies indicated by the SIB5 may be logged in MeaResultIdleEUTRA.

When EMR is configured with the SIB11 or the RRCRelease message

When the idleModeMeasVoiceFallback field is broadcast as included in the SIB5

When the UE triggers access to receive the IMS service

When the eCallOverIMS-Support field is broadcast as included in the SIB1

Figure 7:
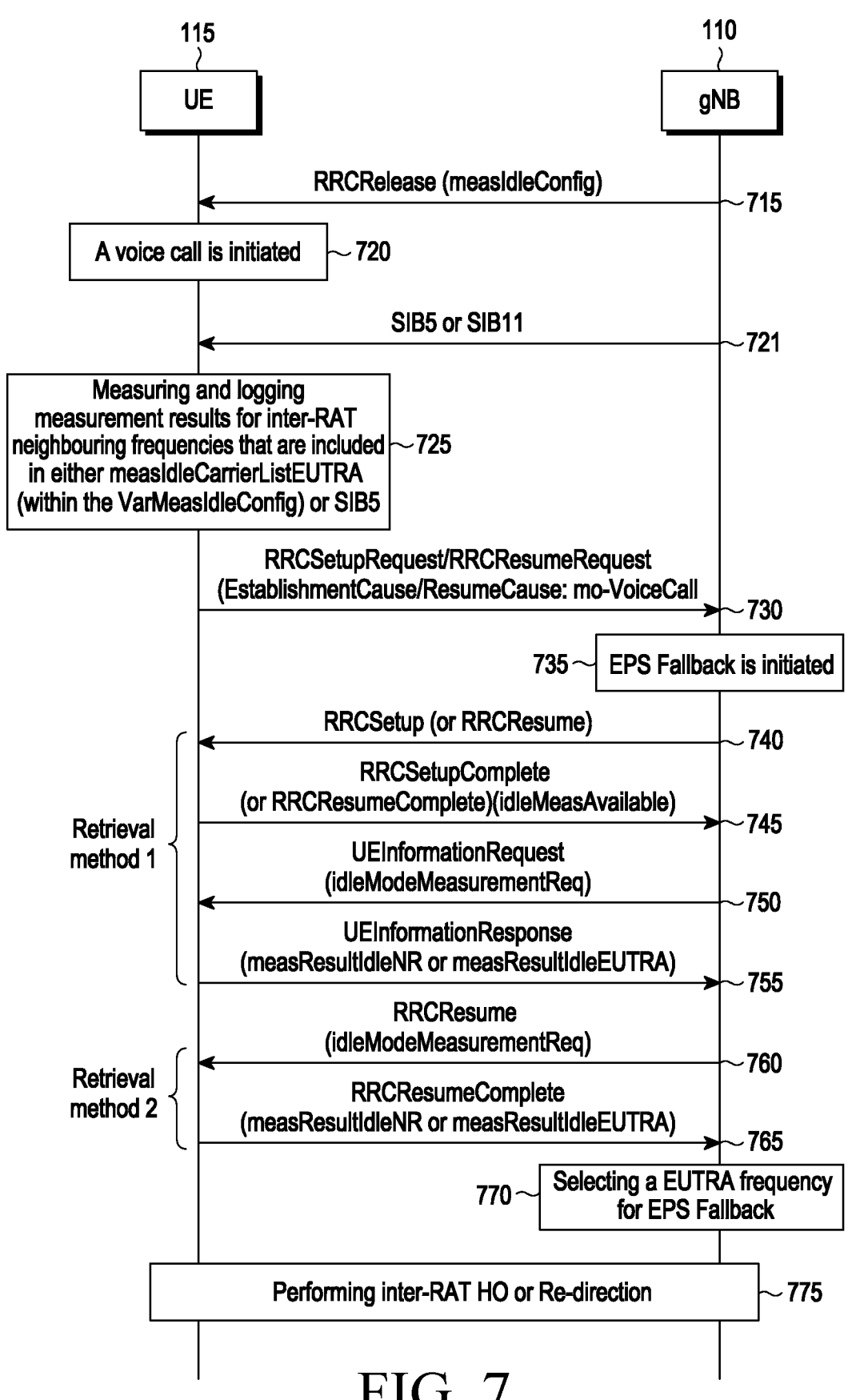
FIG. 7 illustrates a flowchart for a process of effectively logging early EPS fallback-related information according to an embodiment of the disclosure.

FIG. 7 illustrates a flowchart for a process of logging early EPS fallback-related information according to an embodiment of the disclosure.

A base station 110 may transmit an RRCRelease message including a MeasIdleConfigDedicated IE to a UE 115 (715). The MeasIdleConfigDedicated IE may include information used to perform an EMR operation. Information about a frequency to be measured and stored for EMR may be included in the MeasIdleConfigDedicated IE included in the RRCRelease message 715 or a MeasIdleConfigSlB IE stored in a SIB11 721. Upon receiving the RRCRelease message 715, the UE 115 may be switched from a connected mode to a standby mode or an inactive mode.

The UE 115 may trigger an IMS voice service (720).

The UE 115 may identify whether an idleMode-MeasVoiceFallback field is included in a SIB5 721. When the idleModeMeasVoiceFallback field is included in the SIB5 721, the UE 115 that triggers the IMS voice service may also consider an EUTRA frequency for cell reselection stored in the SIB5 721 as a frequency logged through an EMR operation (725). In this embodiment, the UE 115 may log the EUTRA frequency configured for EMR and the EUTRA frequency indicated by the SIB5 according to the following options.

First option: Limiting the maximum number of EUTRA frequencies indicated by the SIB5 that may be stored in a measResultIdleEUTRA IE (or limiting the maximum number of EUTRA frequencies configured for EMR)

To evenly store EUTRA frequencies configured for EMR and EUTRA frequencies indicated by the SIB5 in the measResultIdleEUTRA IE, the maximum number of frequencies of each type that may be stored in the measResultIdleEUTRA IE may be limited. For example, among up to eight frequencies that may be stored in the measResultIdleEUTRA IE, up to four EUTRA frequencies configured for EMR and up to four EUTRA frequencies indicated by the SIB5 may be stored. The maximum number of frequencies of each type that may be stored is predefined, or may be configured by a base station through a predetermined RRC message or through a SIB.

Here, since measurement results of all EUTRA frequencies indicated by the SIB5 may not be stored in the measResultIdleEUTRA IE, the UE may determine a frequency to be included in the IE among the frequencies. The UE may determine the frequency to be included in an order of EUTRA frequencies having a best signal strength, based on signal strength in cells belonging to the respective EUTRA frequencies, may determine the frequency to be included in an order of EUTRA frequencies having a highest cell reselection priority provided by the SIB5, or may determine the frequency to be included according to a UE configuration (e.g., randomly, a past storage history, or an IMS-supported EUTRA frequency history).

Similarly, since measurement results of all EUTRA frequencies configured for EMR may not be stored in the measResultIdleEUTRA IE, the UE may determine a frequency to be included in the measResultIdleEUTRA IE among the frequencies configured for EMR. The UE may determine the frequency to be included in an order of EUTRA frequencies having a best signal strength, based on signal strength in cells belonging to the respective EUTRA frequencies, or may determine the frequency to be included according to a UE configuration (e.g., randomly or a past storage history).

Second option: Storing an EUTRA frequency capable of providing a signal strength higher than a specific threshold value (e.g., reference signal received power (RSRP) and/or reference signals received quality (RSRQ)) in a measResultIdleEUTRA IE The specific threshold may be predefined, or may be configured by the base station through a predetermined RRC message or SIB. The UE may use a cell providing a best signal strength among cells belonging to respective EUTRA frequencies for comparison.

Third option: Ignoring the EUTRA frequency configured for EMR and storing the EUTRA frequency indicated by the SIB5

According to the procedure illustrated in FIG. 6, when the UE needs to store the EUTRA frequency indicated by the SIB5 for early EPS fallback, the UE may not store the EUTRA frequency configured for EMR. When the UE is connected to the base station to receive an IMS voice service and the base station configures EPS fallback, there is no need to add a SCell for the UE through EMR.

Fourth option: Increasing the number of EUTRA frequencies that may be stored in a measResultIdleEUTRA IE so that all EUTRA frequencies may be stored (e.g., changing the value of maxFreqIdle in Table 1 from 8 to 16) to solve the foregoing problem Here, a new UE capability indicating whether the extended measResultIdleEUTRA IE is supported may be introduced, and configuration information indicating whether the IE needs to be applied may be provided to the UE through a predetermined RRC message or SIB.

Fifth option: Introducing a separate new measResultIdleEUTRA IE used to store the EUTRA frequency indicated by the SIB5

A new UE capability indicating whether the new measResultIdleEUTRA IE is supported may be introduced, and configuration information indicating whether the IE needs to be applied may be provided to the UE through a predetermined RRC message or SIB.

The foregoing options may be selectively applied according to a base station configuration, and a combination of the options is also applicable. For example, the first option and the second option may be applied together, for example, in a case where a threshold value is considered as a criterion for selecting a limited number of frequencies. To indicate support of the base station for the extended measResultIdleEUTRA IE or the new measResultIdleEUTRA IE in the fourth option and fifth option, one new indicator may be introduced into the SIB. Further, a new availability indicator for requesting the IE may be introduced.

To switch to the connected mode, the UE 115 may transmit an RRCSetupRequest or RRCResumeRequest message including mo-VoiceCall, which is a predetermined cause value indicating the IMS voice service, to the base station 110 (730).

Upon receiving the message 730, the base station 110 may trigger an EPS fallback operation (735).

Procedures for reporting an EMR measurement result to the base station may be largely divided into two types, which have been described in detail with reference to FIGS. 4A and 4B. The EUTRA frequency measurement result used to perform EPS fallback may be stored in a MeasResultIdleEUTRA IE, and may be transmitted to the base station through a UEInformationResponse or RRCResumeComplete message including the MeasResultIdleEUTRA IE (755 and 765).

A base station supporting early EPS fallback may understand the reported measurement result MeasResultIdleEUTRA IE, while a base station not supporting early EPS fallback will not understand the measurement result MeasResultIdleEUTRA IE even though receiving the measurement result. Therefore, to prevent unnecessary reporting by the UE, an indicator indicating whether the base station understands a report related to the early EPS fallback may be provided through a predetermined SIB (e.g., SIB1). When there is no indicator indicating whether the base station understands the report related to the early EPS fallback, the UE may not report information including the measurement result of the EUTRA frequency belonging to the SIB5 to the base station.

Upon receiving the messages 755 and 765, the base station 110 may select one EUTRA frequency suitable for the EPS fallback, based on the cell measurement result stored in the messages 755 and 765 (770).

The base station 110 may configure an inter-RAT handover (HO) or redirection of the UE 115 to the selected EUTRA frequency (775).

Figure 8:
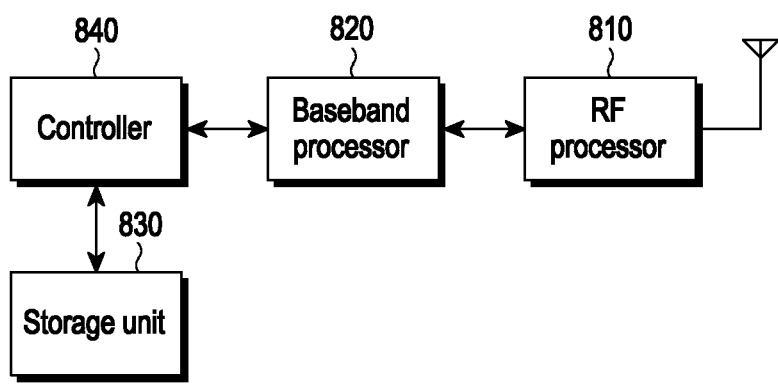
FIG. 8 illustrations a block diagram for the configuration of a UE according to an embodiment of the disclosure.

FIG. 8 illustrates a block diagram for the internal structure of a UE according to the disclosure.

Referring to FIG. 8, the UE may include at least one of a radio frequency (RF) processor 810, a baseband processor 820, a storage unit 830, and a controller 840.

The RF processor 810 may perform a function for transmitting or receiving a signal through a wireless channel, such as band conversion and amplification of a signal. That is, the RF processor 810 may upconvert a baseband signal, provided from the baseband processor 820, into an RF band signal to transmit the RF band signal through an antenna, and may downconvert an RF band signal, received through the antenna, into a baseband signal. For example, the RF processor 810 may include at least one of a transmission filter, a reception filter, an amplifier, a mixer, an oscillator, a digital-to-analog converter (DAC), and an analog-to-digital converter (ADC). Although FIG. 8 shows only one antenna, the UE may include a plurality of antennas. In addition, the RF processor 810 may include a plurality of RF chains. Further, the RF processor 810 may perform beamforming. For beamforming, the RF processor 810 may adjust the phase and strength of each of signals transmitted and received through a plurality of antennas or antenna elements. The RF processor 810 may perform MIMO, and may receive a plurality of layers when performing MIMO.

The baseband processor 820 may perform a function of converting a baseband signal and a bit stream according to the physical-layer specification of a system. For example, in data transmission, the baseband processor 820 may encode and modulate a transmission bit stream, thereby generating complex symbols. In data reception, the baseband processor 820 may demodulate and decode a baseband signal, provided from the RF processor 810, thereby reconstructing a reception bit stream. For example, according to OFDM, in data transmission, the baseband processor 820 may generate complex symbols by encoding and modulating a transmission bit stream, may map the complex symbols to subcarriers, and may construct OFDM symbols through an inverse fast Fourier transform (IFFT) and cyclic prefix (CP) insertion. In data reception, the baseband processor 820 may divide a baseband signal, provided from the RF processor 810, into OFDM symbols, may reconstruct signals mapped to subcarriers through a fast Fourier transform (FFT), and may reconstruct a reception bit stream through demodulation and decoding.

As described above, the baseband processor 820 and the RF processor 810 may transmit and receive signals. Accordingly, the baseband processor 820 and the RF processor 810 may be referred to as a transmitter, a receiver, a transceiver, or a communication unit. At least one of the baseband processor 820 and the RF processor 810 may include a plurality of communication modules to support a plurality of different radio access technologies. Further, at least one of the baseband processor 820 and the RF processor 810 may include different communication modules for processing signals in different frequency bands. For example, the different radio access technologies may include a wireless LAN (e.g., IEEE 802.11), a cellular network (e.g., LTE or NR), and the like. In addition, the different frequency bands may include a super high frequency (SHF) band (e.g., 2.5 GHz, 5 GHz) and a millimeter wave band (e.g., 60 GHz).

The storage unit 830 may store data, such as a default program, an application, and configuration information for operating the UE. The storage unit 830 may provide stored data upon request from the controller 840.

The controller 840 may control overall operations of the UE. For example, the controller 840 may transmit and receives signal through the baseband processor 820 and the RF processor 810. Further, the controller 840 may record and read data in the storage unit 830. To this end, the controller 840 may include at least one processor. For example, the controller 840 may include a communication processor (CP) to perform control for communication and an application processor (AP) to control an upper layer, such as an application.

All operations of the UE described in the disclosure may be understood as being performed by control of the controller 840. However, the controller 840 and the transceiver are not necessarily configured as separate devices, but may be configured as a single component, such as a single chip.

Figure 9:
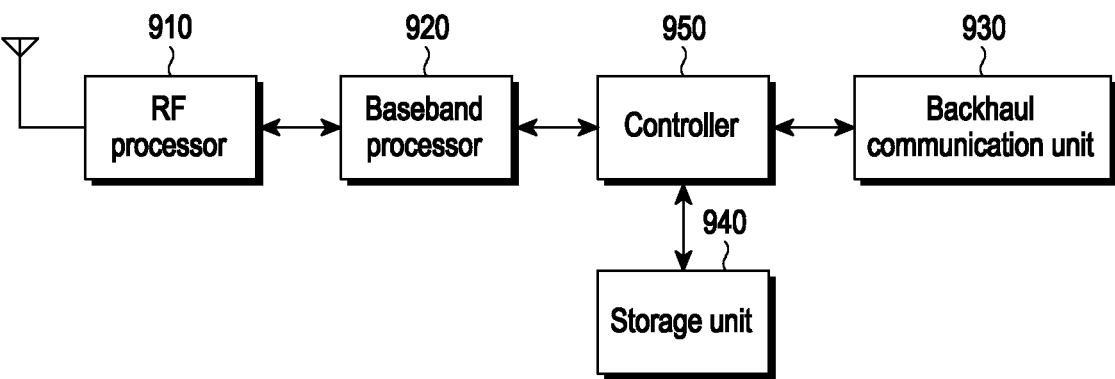
FIG. 9 illustrates a block diagram for the configuration of a base station according to an embodiment of the disclosure.

FIG. 9 illustrates a block diagram for the configuration of a base station according to the disclosure.

As illustrated in FIG. 9, the base station may include at least one of an RF processor 910, a baseband processor 920, a backhaul communication unit 930, a storage unit 940, and a controller 950.

The RF processor 910 may perform a function for transmitting or receiving a signal through a wireless channel, such as band conversion and amplification of a signal. That is, the RF processor 910 may upconvert a baseband signal, provided from the baseband processor 920, into an RF band signal to transmit the RF band signal through an antenna, and may downconvert an RF band signal, received through the antenna, into a baseband signal. For example, the RF processor 910 may include a transmission filter, a reception filter, an amplifier, a mixer, an oscillator, a DAC, and an ADC. Although FIG. 9 shows only one antenna, the base station may include a plurality of antennas. In addition, the RF processor 910 may include a plurality of RF chains. Further, the RF processor 910 may perform beamforming. For beamforming, the RF processor 910 may adjust the phase and strength of each of signals transmitted and received through a plurality of antennas or antenna elements. The RF processor 910 may transmit one or more layers, thereby performing downlink MIMO.

The baseband processor 920 may perform a function of converting a baseband signal and a bit stream according to the physical-layer specification of a radio access technology. For example, in data transmission, the baseband processor 920 may encode and modulate a transmission bit stream, thereby generating complex symbols. In data reception, the baseband processor 920 may demodulate and decode a baseband signal, provided from the RF processor 910, thereby reconstructing a reception bit stream. For example, according to OFDM, in data transmission, the baseband processor 920 may generate complex symbols by encoding and modulating a transmission bit stream, may map the complex symbols to subcarriers, and may construct OFDM symbols through an IFFT and CP insertion. In data reception, the baseband processor 920 may divide a baseband signal, provided from the RF processor 910, into OFDM symbols, may reconstruct signals mapped to subcarriers through an FFT, and may reconstruct a reception bit stream through demodulation and decoding. As described above, the baseband processor 920 and the RF processor 910 may transmit and receive signals. Accordingly, the baseband processor 920 and the RF processor 910 may be referred to as a transmitter, a receiver, a transceiver, a communication unit, or a wireless communication unit.

The backhaul communication unit 930 may provide an interface for performing communication with other nodes in a network. That is, the backhaul communication unit 930 may convert a bit stream, transmitted from the base station to another node, for example, a secondary base station or a core network, into a physical signal, and may convert a physical signal, received from the other node, into a bit stream.

The storage unit 940 may store data, such as a default program, an application, and configuration information for operating the base station. In particular, the storage unit 940 may store information on a bearer allocated to a connected UE, a measurement result reported from a connected UE, and the like. The storage unit 940 may provide stored data upon request from the controller 950.

The controller 950 may control overall operations of the base station. For example, the controller 950 may transmit and receive signals through the baseband processor 920 and the RF processor 910 or through the backhaul communication unit 930. Further, the controller 950 may record and read data in the storage unit 940. To this end, the controller 950 may include at least one processor.

All operations of the base station described in the disclosure may be understood as being performed by control of the controller 950. However, the controller 950 and the transceiver are not necessarily configured as separate devices, but may be configured as a single component, such as a single chip.

It should be noted that system configuration diagrams, method illustrations, and signal flowcharts illustrated in FIGS. 2 to 7 are not intended to limit the scope of protection of the disclosure. That is, all the constituent units or operation steps shown in FIGS. 2 to 7 should not be construed as essential elements for implementing the disclosure, and even when including only some of the elements, the disclosure may be implemented without impairing the true nature of the disclosure.

The above-described operations may be implemented by providing any unit of a base station or terminal device with a memory device storing corresponding program codes. That is, a controller of the base station or terminal device may perform the above-described operations by reading and executing the program codes stored in the memory device by means of a processor or central processing unit (CPU).

Various constituent units or modules of a base station or terminal device may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE), the method comprising:

receiving, from a base station, first configuration information comprising information on frequencies for early measurement reporting (EMR);

receiving, from the base station, second configuration information comprising information on frequencies for cell reselection;

measuring the frequencies for EMR and the frequencies for cell reselection, based on signal strengths in cells belonging to the frequencies for EMR and the frequencies for cell reselection, respectively;

determining a first measurement result of at least some of the frequencies for EMR and the frequencies for cell reselection;

transmitting, to the base station, a message comprising the first measurement result; and performing evolved packet system (EPS) fallback to one frequency based on the first measurement result, wherein in case that the second configuration information comprises a field indicating fallback or the UE has switched to a connected mode to start an IP multimedia subsystem (IMS) voice service, the message comprises a second measurement result of at least some of the frequencies for cell reselection, wherein the at least some of the frequencies for EMR and the frequencies for cell reselection in the message are determined as frequencies having a signal strength higher than a specific threshold value.

2. The method of claim 1, wherein a number of the frequencies for cell reselection in the message is limited to be less than a maximum number of frequencies in the message.

3. The method of claim 1, wherein the message comprises an extended measurement result log information element (IE) having, as a maximum number, a sum of a number of the frequencies for EMR and a number of frequencies for cell reselection.

4. The method of claim 1, wherein the message comprises a first IE logging the first measurement result of the frequencies for EMR, and a second IE logging the first measurement result of the frequencies for cell reselection.

5. The method of claim 1, wherein the first configuration information is received through a system information block11 (SIB11) or a radio resource control release (RRCRelease) message, and wherein the second configuration information is received through a SIB5.

6. The method of claim 1, wherein the first measurement result is included in a measResultIdleEUTRA IE, and the message is a UEInformationResponse message or an RRCResumeComplete message.

7. The method of claim 1, further comprising:

transmitting, to the base station, an RRCsetupRequest message or an RRCResumeRequest message, wherein the RRCsetupRequest message or the RRCResumeRequest message comprises a predetermined cause value indicating the IMS voice service.

8. A method performed by a base station, the method comprising:

transmitting, to a user equipment (UE), first configuration information comprising information on frequencies for early measurement reporting (EMR);

transmitting, to the UE, second configuration information comprising information on frequencies for cell reselection;

receiving, from the UE, a message comprising a first measurement result of at least some of the frequencies for EMR and the frequencies for cell reselection, wherein the first measurement result is measured based on signal strengths in cells belonging to the frequencies for EMR and the frequencies for cell reselection, respectively; and performing evolved packet system (EPS) fallback of the UE to one frequency based on the first measurement result, wherein in case that the second configuration information comprises a field indicating fallback or the UE is switched to a connected mode to start an IP multimedia subsystem (IMS) voice service, the message comprises a second measurement result of at least some of the frequencies for cell reselection, wherein the at least some of the frequencies for EMR and the frequencies for cell reselection in the message are determined as frequencies having a signal strength higher than a specific threshold value.

9. The method of claim 8, wherein a number of the frequencies for cell reselection in the message is limited to be less than a maximum number of frequencies in the message.

10. The method of claim 8, wherein the message comprises an extended measurement result log information element (IE) having, as a maximum number, a sum of a number of the frequencies for EMR and a number of frequencies for cell reselection.

11. The method of claim 8, wherein the message comprises a first IE logging the first measurement result of the frequencies for EMR and a second IE logging the first measurement result of the frequencies for cell reselection.

12. The method of claim 8, wherein the first configuration information is transmitted through a system information block11 (SIB11) or a radio resource control release (RRCRelease) message, and wherein the second configuration information is transmitted through a SIB5.

13. The method of claim 8, wherein the first measurement result is included in a measResultIdleEUTRA IE, and the message is a UEInformationResponse message or an RRCResumeComplete message.

14. The method of claim 8, further comprising:

receiving from the UE an RRCsetupRequest message or an RRCResumeRequest message, wherein the RRCsetupRequest message or the RRCResumeRequest message comprises a predetermined cause value indicating the IMS voice service.

15. A user equipment (UE) comprising:

a transceiver; and a processor configured to control the transceiver to:

receive, from a base station, first configuration information comprising information on frequencies for early measurement reporting (EMR);

receive, from the base station, second configuration information comprising information on frequencies for cell reselection;

measure the frequencies for EMR and the frequencies for cell reselection, based on signal strengths in cells belonging to the frequencies for EMR and the frequencies for cell reselection, respectively;

determine a first measurement result of at least some of the frequencies for EMR and the frequencies for cell reselection;

transmit, to the base station, a message comprising the first measurement result of at least some of the frequencies for EMR and the frequencies for cell reselection; and perform evolved packet system (EPS) fallback to one frequency based on the first measurement result, wherein in case that the second configuration information comprises a field indicating fallback or the UE has switched to a connected mode to start an IP multimedia subsystem (IMS) voice service, the message comprises a second measurement result of at least some of the frequencies for cell reselection, wherein the at least some of the frequencies for EMR and the frequencies for cell reselection in the message are determined as frequencies having a signal strength higher than a specific threshold value.

16. A base station comprising:

a transceiver; and a processor configured to control the transceiver to:

transmit, to a user equipment (UE), first configuration information comprising information on frequencies for early measurement reporting (EMR);

transmit, to the UE, second configuration information comprising information on frequencies for cell reselection;

receive, from the UE, a message comprising a first measurement result of at least some of the frequencies for EMR and the frequencies for cell reselection, wherein the first measurement result is measured based on signal strengths in cells belonging to the frequencies for EMR and the frequencies for cell reselection, respectively; and perform evolved packet system (EPS) fallback of the UE to one frequency based on the first measurement result, wherein in case that the second configuration information comprises a field indicating fallback or the UE is switched to a connected mode to start an IP multimedia subsystem (IMS) voice service, the message comprises a second measurement result of at least some of the frequencies for cell reselection, wherein the at least some of the frequencies for EMR and the frequencies for cell reselection in the message are determined as frequencies having a signal strength higher than a specific threshold value.

* * * * *